United States Patent
Huo et al.

(10) Patent No.: US 12,344,530 B2
(45) Date of Patent: Jul. 1, 2025

(54) METHOD FOR PURIFYING SILICON BY MEANS OF PHASE SEPARATION DEALLOYING REACTION

(71) Applicant: WUHAN UNIVERSITY OF SCIENCE AND TECHNOLOGY, Hubei (CN)

(72) Inventors: Kaifu Huo, Hubei (CN); Biao Gao, Hubei (CN); Weili An, Hubei (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 627 days.

(21) Appl. No.: 17/600,611

(22) PCT Filed: Jun. 18, 2019

(86) PCT No.: PCT/CN2019/091750
§ 371 (c)(1),
(2) Date: Oct. 1, 2021

(87) PCT Pub. No.: WO2020/199366
PCT Pub. Date: Oct. 8, 2020

(65) Prior Publication Data
US 2022/0177316 A1    Jun. 9, 2022

(30) Foreign Application Priority Data

Apr. 4, 2019    (CN) .......................... 201910272586.X

(51) Int. Cl.
*C01B 33/039*    (2006.01)
(52) U.S. Cl.
CPC ........ *C01B 33/039* (2013.01); *C01P 2002/72* (2013.01); *C01P 2004/04* (2013.01); *C01P 2006/80* (2013.01)

(58) Field of Classification Search
CPC . C01B 33/039; C01B 33/037; C01P 2002/72; C01P 2004/04; C01P 2006/80
See application file for complete search history.

(56) References Cited

U.S. PATENT DOCUMENTS

2010/0015028 A1*  1/2010  Johnson ................ C01B 33/023
977/773

FOREIGN PATENT DOCUMENTS

| CN | 102311121 | | 1/2012 | |
| CN | 105347346 A | * | 2/2016 | ........... C01B 33/023 |

(Continued)

OTHER PUBLICATIONS

Bao et al. CN105347346A English Translation (Year: 2016).*

(Continued)

*Primary Examiner* — Samir Shah
*Assistant Examiner* — Jordan W Taylor
(74) *Attorney, Agent, or Firm* — JCIP GLOBAL INC.

(57) ABSTRACT

The invention provides a method for purifying silicon by means of a phase separation dealloying reaction, including: mixing a silicon raw material containing metallic or nonmetallic impurities with magnesium powder first and then fully reacting under an inert atmosphere so as to obtain a first product; placing the first product in a nitrogen-containing atmosphere to undergo a nitriding reaction to form three-dimensional porous silicon and magnesium nitride distributed in pore channels thereof so as to obtain a second product, the impurities further being separated during the precipitation and crystallization of silicon, and being dissolved in the liquid-phase magnesium nitride; treating the second product by using acid-pickling, the magnesium nitride and impurities being dissolved and converted into a solution, and a solid product being high-purity porous silicon.

8 Claims, 2 Drawing Sheets

(56) References Cited

FOREIGN PATENT DOCUMENTS

| CN | 105399100 | | 3/2016 | |
|----|-----------|---|--------|---|
| CN | 105845918 | | 8/2016 | |
| CN | 105845918 A | * | 8/2016 | |
| CN | 107215874 | | 9/2017 | |
| CN | 107215874 A | * | 9/2017 | ........... C01B 33/021 |
| CN | 108417819 | | 8/2018 | |

OTHER PUBLICATIONS

Huo et al. CN107215874A English Translation (Year: 2017).*
Hayati-Roodbari et al. Dalton Trans, 2017, 46, 8855 (Year: 2017).*
Semi.org, Metallurgical-grade Silicon Making Inroads in PV, search prior to Apr. 4, 2019 (Year: 2019).*
Trivedi et al. Magnesium and Manganese Silicides For Efficient, Nov. 18, 2013 (Year: 2013).*
Lences et al. J. Am. Ceram. Soc., 2003, 86, 1088-93 (Year: 2003).*
Du et al. CN105845918A English Translation (Year: 2016 (Year: 2016).*
Zong et al. PNAS, 2015, 112, 44, 13473-13477 (Year: 2015).*
An et al. Nature Communications 2019, 10, 1447 (Year: 2019).*
Weili An, et al., "Scalable synthesis of ant-nest-like bulk porous silicon for high-performance lithium-ion battery anodes", Nature Communications, vol. 10, Mar. 29, 2019, pp. 1-11.
Takeshi Wada, et al., "Bulk-Nanoporous-Silicon Negative Electrode with Extremely High Cyclability for Lithium-Ion Batteries Prepared Using a Top-Down Process", Nano Letters, vol. 14, Jul. 2, 2014, pp. 4505-4510.
"International Search Report (Form PCT/ISA/210)"of PCT/CN2019/091750, with English translation thereof, mailed on Jan. 3, 2020, pp. 1-6.

* cited by examiner

METHOD FOR PURIFYING SILICON BY MEANS OF PHASE SEPARATION DEALLOYING REACTION

CROSS-REFERENCE TO RELATED APPLICATION

This application is a 371 of international application of PCT application serial no. PCT/CN2019/091750, filed on Jun. 18, 2019, which claims the priority benefit of China application no. 201910272586.X, filed on Apr. 4, 2019. The entirety of each of the above mentioned patent applications is hereby incorporated by reference herein and made a part of this specification.

BACKGROUND

Technical Field

The invention belongs to the technical field of purification of silicon, and more specifically, relates to a method for purifying silicon by means of phase separation dealloying reaction.

Description of Related Art

High-purity silicon is an important and fundamental material for photovoltaic industry, electronic information industry, lithium-ion batteries, semiconductors, and the defense industry. In particular, the demand for high-purity silicon is high in solar grade silicon industry, and typically the required purity is 99.99 to 99.9999%. The raw material for the preparation of solar grade silicon is metallurgical-level silicon, and the purity of metallurgical-level silicon is typically 98 to 99.5%. Chemical method is a common method for industrialized production of high-purity silicon. Such method mainly includes Siemens process and modified Siemens process. The main principle of this process is to react silicon with chlorine to convert it into silicide with low-boiling point such as trichlorosilane and so on. Then the obtained trichlorosilane is purified by means of rectification and the like, and then reduced by hydrogen to obtain elemental silicon and hydrogen chloride. The product has high purity, but the shortcoming of the product is high toxicity as the raw material, high energy consumption, serious pollution, costly investment in equipment and high production cost. The cost for producing polysilicon is high, which severely restricts the application of high-purity silicon and the development of related industries.

In addition, there are also some other metallurgical purification methods. This method mainly adopts physical methods such as acid-pickling, vacuum treatment, directional solidification, electron beam melting, plasma oxidation refining, etc. In this method, the silicon does not undergo chemical conversion reaction, and the production cost of high-purity silicon can be effectively reduced, but there are problems such as high processing temperature (about 2000° C.) and high energy consumption. In addition, the various processes in the metallurgical method have obvious effects in removal of certain impurities, but these processes need to be applied in combination so as to obtain high-purity silicon. Moreover, impurities such as B and P in silicon need to be further removed by additional slagging and high-vacuum smelting. The process is relatively complicated, which further affects large-scale production of high-purity silicon.

In order to overcome the problems and shortcomings such as high cost, high energy consumption and complex process of the modified Siemens process and metallurgical method, it is a great challenge in known technologies to seek a method that can simultaneously remove metal and non-metal impurities in silicon to realize a simple silicon fabrication process that is low in energy consumption, green, environmentally friendly, low-cost, and capable of achieving large-scale silicon purification.

SUMMARY

In view of the above defects or requirements for improvement of the background art, the invention provides a method for purifying silicon by means of a phase separation dealloying reaction. First of all, a silicon element in the silicon raw material containing impurities is converted into magnesium silicide to realize first separation of silicon and impurities. Then the silicon-magnesium alloy is converted into magnesium nitride in a nitrogen-containing atmosphere, and the silicon with a three-dimensional porous structure is re-precipitated to achieve further separation of silicon and impurities. The magnesium nitride is formed in the three-dimensional pores. Finally, acid-pickling is performed to remove magnesium nitride and the impurities mixed in it, thereby solving the technical problems of high cost, high energy consumption and complex process in the existing modified Siemens process and metallurgical method for purifying silicon.

In order to achieve the above purpose, according to one aspect of the invention, a method for purifying silicon by means of a phase separation dealloying reaction is provided, which includes the following steps.

(1) A silicon raw material containing impurities is mixed with magnesium powder and then fully reacted under an inert atmosphere so that silicon atoms in the silicon raw material react with magnesium to be converted into magnesium silicide, the impurities in the silicon raw material are simultaneously separated from silicon-containing substance so as to obtain a first product.

(2) The first product is placed in a nitrogen-containing atmosphere to undergo a nitriding reaction. In the reaction process, the magnesium silicide in the first product is converted into a liquid-phase magnesium nitride, while silicon is precipitated and crystallized from the liquid-phase magnesium nitride to form three-dimensional porous silicon having a nano-skeleton structure and magnesium nitride distributed in pore channels thereof so as to obtain a second product. The silicon is further separated from the impurities during the precipitation and crystallization of silicon.

(3) The second product is treated by using acid-pickling, and the magnesium nitride and impurities are dissolved and converted into a solution, and a solid product is high-purity porous silicon. The purity of the high-purity porous silicon is 99% or higher.

Preferably, the impurity-containing silicon raw material in step (1) is crushed or ball milled to obtain a powdered silicon raw material.

Preferably, the mass ratio of the content of silicon in the impurity-containing silicon raw material in step (1) to the magnesium powder is 1:(1-3).

Preferably, the reaction temperature of step (1) is 400 to 900° C., the temperature is kept within the range for 1 to 12 hours, and the heating rate is 1 to 20° C./min.

Preferably, the inert atmosphere in step (1) is a protective atmosphere such as argon.

Preferably, the silicon raw material in step (1) is metallurgical silicon, ferrosilicon alloy, waste silicon from electronic industry or waste silicon cutting in solar industry.

Preferably, the reaction temperature of step (2) is 400 to 1000° C., the temperature is kept within the range for 1 to 10 hours, and the heating rate is 1 to 20° C./min.

Preferably, the nitrogen-containing atmosphere in step (2) contains one or more of ammonia, nitrogen, nitrogen plasma and a nitrogen-containing organic substance.

Preferably, an inorganic acid-containing aqueous solution is adopted in the acid-pickling treatment in step (3), and the inorganic acid is hydrochloric acid, sulfuric acid or nitric acid.

Preferably, the high-purity porous silicon obtained in step (3) is used as the impurity-containing silicon raw material described in step (1), and steps (1) to (3) are performed repeatedly to further purify the porous silicon.

In summary, compared with the background art, the above technical solutions conceived by the invention can achieve the following advantageous effects.

(1) The invention provides a method for purifying silicon by means of a phase separation dealloying reaction. First of all, a silicon element in the silicon raw material containing impurities is converted into magnesium silicide to realize first separation of silicon and impurities. Then the silicon-magnesium alloy is converted into magnesium nitride in a nitrogen-containing atmosphere, and the silicon with a three-dimensional porous structure is re-precipitated to achieve further separation of silicon and impurities. The magnesium nitride is formed in the porous channel. Finally, acid-pickling is performed to remove magnesium nitride and the impurities, thereby obtaining high-purity silicon. The purity of the obtained silicon may be 99% or higher.

(2) The whole process of the method for purifying silicon provided by the invention has only three steps, including magnesization, nitriding and acid-pickling. The reaction temperature does not exceed 1000° C., the whole cycle is short, and there is no need to use special equipment such as high-temperature and high-pressure equipment. The method provided in the invention has low energy consumption. As compared with conventional methods for purifying silicon, such as modified Siemens method and metallurgical method which cause high energy consumption, high pollution and high cost, the method of the invention has prominent advantages in process, equipment, energy consumption, efficiency and cost.

(3) In the method of the invention, silicon is precipitated at nanometer size to form a three-dimensional structure. The precipitation process can realize the initial separation of silicon and impurities, and can simultaneously remove impurities and non-impurity elements, thus having universal applicability.

(4) The invention has low requirements for silicon-containing raw materials, which can be ferrosilicon alloys, metallurgical silicon and other silicon wastes. Only a preliminary estimate of the required content of magnesium is required to achieve high-yield separation of silicon, so the invention has an advantageous effect in this aspect. Meanwhile, the acid-pickling process adopts acids with low cost and low-corrosive ability as raw materials, and does not require highly oxidizing or highly-corrosive acids such as hydrofluoric acid, so the invention has operability and high safety. In addition, the by-products of silicon purification are mainly ammonia and chloride salts. Chloride salts can be used as raw materials. As common chemical raw materials, ammonia can be used in chemical industry after exhaust gas treatment. No organic or toxic substances are discharged during the whole process. The invention is clean, environmental and safe.

(5) The silicon obtained by the invention has high purity, impurity elements are completely removed. Purification steps can be easily repeated for multiple times to achieve production of ultra-high purity silicon. The purity of silicon can reach 99.99% or higher, which can satisfy the requirement for silicon with high quality such as solar grade silicon.

DESCRIPTION OF THE EMBODIMENTS

In order to make the purpose, technical solutions, and advantages of the present invention clearer, the following describes the present invention in further detail with reference to the accompanying drawings and embodiments. It should be understood that the specific embodiments described here are used to explain the present invention, but not to limit the present invention. In addition, the technical features involved in the various embodiments of the present invention described below can be combined with each other as long as they do not conflict with each other.

Figure 1:
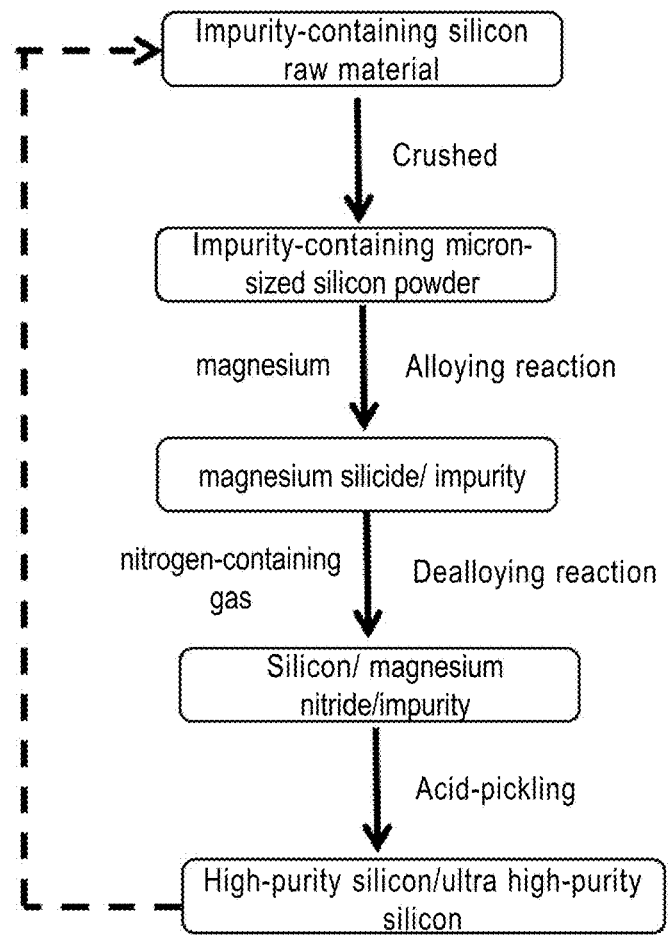
FIG. 1 is a technical roadmap of the method for purifying silicon by means of phase separation dealloying reaction embodied by the invention.

The method for purifying silicon by means of a phase separation dealloying reaction provided by the invention as shown in FIG. 1 includes the following steps.

(1) The silicon powder containing impurities is mixed with magnesium powder and then fully reacted under an inert atmosphere so that silicon atoms in the silicon raw material react with magnesium to be converted into magnesium silicide, the impurities in the silicon raw material are simultaneously separated from silicon so as to obtain a first product.

(2) The first product is placed in a nitrogen-containing atmosphere to undergo a nitriding reaction. In the reaction process, the magnesium silicide in the first product is converted into a liquid-phase magnesium nitride, while silicon is precipitated and crystallized from the liquid-phase magnesium nitride to form three-dimensional porous silicon having a nano-skeleton structure. After cooling, the magnesium nitride is distributed in pore channels of the porous silicon so as to obtain a second product. The silicon is further separated from the impurities during the precipitation and crystallization of silicon.

(3) The second product is treated by using acid-pickling, and the magnesium nitride and impurities are dissolved and converted into a solution, and a solid product is high-purity porous silicon. The purity of the high-purity porous silicon is 99% or higher.

The purpose of step (1) of the invention is to completely combine the silicon in the silicon raw material and magnesium and convert them into magnesium silicide. In some embodiments, the mass ratio of the content of silicon in the impurity-containing silicon raw material in step (1) to the magnesium powder is 1:(1-3). The reaction temperature of step (1) is 400 to 900° C., the temperature is kept within the range for 1 to 12 hours.

In some embodiments, the inert atmosphere in step (1) is an argon atmosphere.

The invention can be applied to a wide range of silicon raw materials containing impurities, and the impurities can be metallic impurities or non-metallic impurities, such as metallurgical silicon, ferrosilicon alloy, waste silicon from electronic industry or waste silicon cutting in solar industry. The silicon content of metallurgical silicon is about 98%, and the main impurities include Fe, Al, Ni, Mn, Cr, Zn, etc.; there are many grades of ferrosilicon alloys, and the silicon content thereof is generally 40 to 95%, the main impurities included therein are Al, Ca, Mn, Cr, P, S, etc. The main impurities in waste silicon from the electronic information industry are B, P and other elements. The main impurities in waste silicon cutting in solar industry are silicon oxide, iron oxide, carbon and silicon carbide. The metallic elements and non-metallic elements (B, P, etc.) in these raw materials can be separated and removed by the means of the invention.

The silicon raw material used in the invention can be powdered material, block material or materials in other forms. If the silicon raw material is in the form of block or has a large size, first of all, the silicon raw material is crushed or ball milled to obtain a powdered silicon material. Preferably, the silicon raw material is crushed to micron-sized silicon powder.

The magnesium powder used in the invention is commercially available. Since the melting point of the magnesium powder is relatively low, there is no limit to the particle size as long as the magnesium powder is adopted.

In step (1), the separation of impurities and silicon in the silicon raw material means that, at a high temperature, silicon atoms react with magnesium to separate the impurity elements bonded to silicon in the raw material from silicon.

The purpose of step (2) of the invention is to make the magnesium silicide in the product of step (1) to be produced in a nitrogen-containing atmosphere, so that the nitrogen element of the nitrogen-containing atmosphere is combined with magnesium to form molten magnesium nitride. In other words, in this process, the crystal lattice of magnesium silicide in the first product is destroyed, and while magnesium nitride is formed, silicon is re-precipitated to form crystal nuclei and further grows. In some embodiments, the reaction temperature in step (2) is 400 to 1000° C., the temperature is kept within the range for 1 to 10 hours, and the heating rate is 1 to 20° C./min.

The nitrogen-containing atmosphere in step (2) may contain one or more of ammonia, nitrogen, nitrogen plasma and a nitrogen-containing organic substance. The nitrogen-containing atmosphere may further contain an inert gas. The nitrogen-containing atmosphere is mainly used to provide a nitrogen source. In a preferred embodiment, the nitrogen-containing atmosphere is a reactive gas.

The purpose of step (3) of the invention is to dissolve and remove the formed magnesium nitride and impurities dissolved in the magnesium nitride. In some embodiments, the inorganic acid-containing aqueous solution is used in the acid-pickling treatment of step (3). The inorganic acid is hydrochloric acid, sulfuric acid or nitric acid. In a preferred embodiment, the acid used in the acid-pickling treatment in step (3) is an aqueous solution of hydrochloric acid.

In step (2), the magnesium atoms in the magnesium silicide combine with the nitrogen element to form magnesium nitride, and silicon is precipitated and crystallized from the liquid-phase magnesium nitride. In the process, impurities are also dissolved in the liquid-phase magnesium nitride, and the separation of silicon and the impurities is further realized.

In some embodiments, the high-purity porous silicon obtained in step (3) is used as the impurity-containing silicon raw material described in step (1), and steps (1) to (3) are performed repeatedly to further purify the high-purity porous silicon.

The invention provides a new method of purifying silicon. The method mixes impurity-containing silicon raw materials (such as metallurgical silicon, ferrosilicon powder and industrial silicon waste, etc.) with an appropriate amount of magnesium powder, and then fully reacts them in an inert atmosphere, so that silicon is completely converted into a silicon-magnesium compound ($xSi+Mg \rightarrow MgSi_x$). In this process, since silicon and magnesium react to form magnesium silicide, the impurity elements and magnesium silicide can be separated simultaneously. Then, the product is reacted with nitrogen to form silicon and magnesium nitride ($3Mg_xSi+xN_2 \rightarrow 3Si+xMg_3N_2$). At the reaction temperature, $Mg_3N_2$ is a liquid phase. Silicon is precipitated and crystallized to form crystal nuclei from the liquid-phase $Mg_3N_2$ and then grows, so as to form a three-dimensional porous structure composed of a nano-framework and a nano three-dimensional through channel is retained. $Mg_3N_2$ is distributed in the porous channel, and the two form a co-existing composite material. The precipitation, crystallization and growth of silicon element are equivalent to the purification process, which can realize the separation of silicon and impurity elements. The liquid-phase $Mg_3N_2$ can effectively dissolve the impurity elements in the product. After cooling, by solidifying $Mg_3N_2$, the impurity elements (such as Fe, Al, Ca, Mn, B, P, etc.) are fixed therein. After performing acid-pickling, the impurity elements are dissolved in the acid solution along with magnesium nitride. The resulting solid product is high-purity porous silicon, and the impurities are dissolved in the acid to form a salt solution.

Furthermore, during the reaction, since the silicon skeleton with a size of dozens of nanometers is precipitated during the nitriding process, the surrounding nano-porous channel is filled with liquid magnesium nitride, and the distance for the impurity elements to separate from the silicon and dissolve to the magnesium nitride is relatively short. Moreover, the three-dimensional through porous channel expedites efficient dissolution of magnesium nitride and its impurity elements during the acid-pickling process, so that the effective separation of silicon and impurity elements can be achieved to obtain high-purity silicon element.

The invention realizes the purification of silicon through magnesium alloying and nitrogen dealloying, and can further improve the purity of silicon through multiple times of magnesium alloying and nitrogen dealloying processes, thereby obtaining ultra-high purity silicon. The technology of the invention is simple, efficient, green, and low-cost, and the obtained silicon products have high purity, stable and reliable quality, and play an important role in the development and application of solar grade and electronic-level high-purity silicon.

The invention uses three simple steps (magnesium thermal alloying, nitriding dealloying and acid-pickling) to achieve the purpose of purifying silicon, which can be purified up to 99.99% or more, and has achieved unexpected technical effects. Essentially, the invention makes good use of the differences in physical properties between the components (including silicon, magnesium, magnesium silicide, magnesium nitride, and impurity components) involved in the three steps as well as the differences in chemical bonding strengths along with the application of phase separation, chemical bond breakage and chemical bond recombination in combination, thus achieving purification of silicon.

The embodiments are provided below.

First Embodiment

A method for purifying silicon by means of phase separation dealloying reaction includes the following steps.

(1) The metallurgical ferrosilicon powder (content of Si is 80%) and magnesium powder are mixed uniformly at the mass ratio of 1:2 (silicon to magnesium) and put into a heat resistant container.

(2) The container is placed in a tube furnace filled with inert gas and heated to 600° C. at a heating rate of 5° C./min. The temperature is kept for 6 hours, and the obtained product is a silicon-magnesium alloy mixture. After the product is cooled to room temperature along with the furnace, the product is taken out.

(3) The product obtained in step (2) is exposed to an $N_2$ atmosphere and heated to 780° C. at a heating rate of 5° C./min. The temperature is kept for 4 hours. After the product is cooled to room temperature along with the furnace, the product is taken out.

(4) The product obtained in step (3) is subjected to an acid-pickling treatment with 1M of hydrochloric acid to remove magnesium nitride, and then washed, centrifuged, and dried to obtain high-purity silicon. The ICP test results show that the content of the obtained silicon is 99% or more, and the metal elements and non-metal elements are significantly reduced before and after purification.

(5) Steps (1) to (4) are performed repeatedly by using the silicon obtained in step (3) as the silicon raw material to obtain silicon with higher purity as required.

Figure 2:
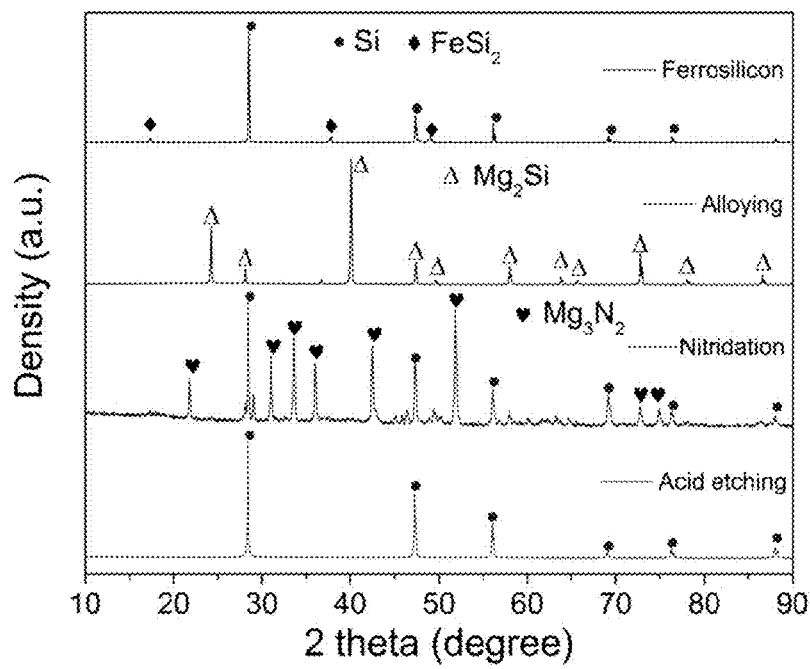
FIG. 2 is a corresponding XRD pattern in the process of preparing high-purity silicon in the first embodiment of the invention.

It can be seen from the XRD of the reaction process in FIG. 2 that after the reaction of ferrosilicon and magnesium powder, a magnesium silicide alloy is formed. After performing nitrogen dealloying, a mixture of silicon and magnesium nitride is formed. After performing acid-pickling, a relatively pure silicon element is obtained.

Figure 3:
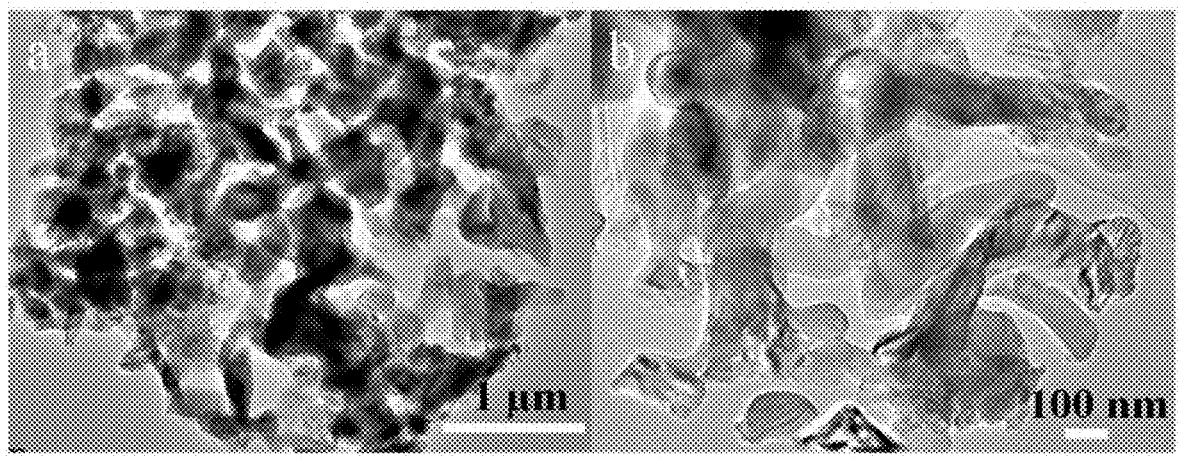
FIG. 3 is a TEM image of the high-purity silicon prepared in the first embodiment of the invention.

The high-purity silicon obtained through the reaction is subjected to TEM analysis, and the result is shown in FIG. 3. It is found that the obtained silicon is a three-dimensional porous structure composed of nano-framework, the nano-framework is 50 to 100 nm, and three-dimensional through pores are retained.

Table 1 shows the percentage of the element content measured by ICP before and after the purification of the ferrosilicon alloy in the first embodiment.

| content (wt %) | Si | Fe | Al | Ca | Mn | Cu | Cr | Mg |
|---|---|---|---|---|---|---|---|---|
| ferrosilicon alloy before the purification | 80.79 | 16.94 | 0.32 | 1.68 | 0.05 | 0.03 | 0.1 | 0.071 |
| ferrosilicon alloy after the purification | 99.73 | 0.11 | 0.03 | 0.01 | 0.003 | 0.01 | 0.03 | 0.021 |

Figure 4:
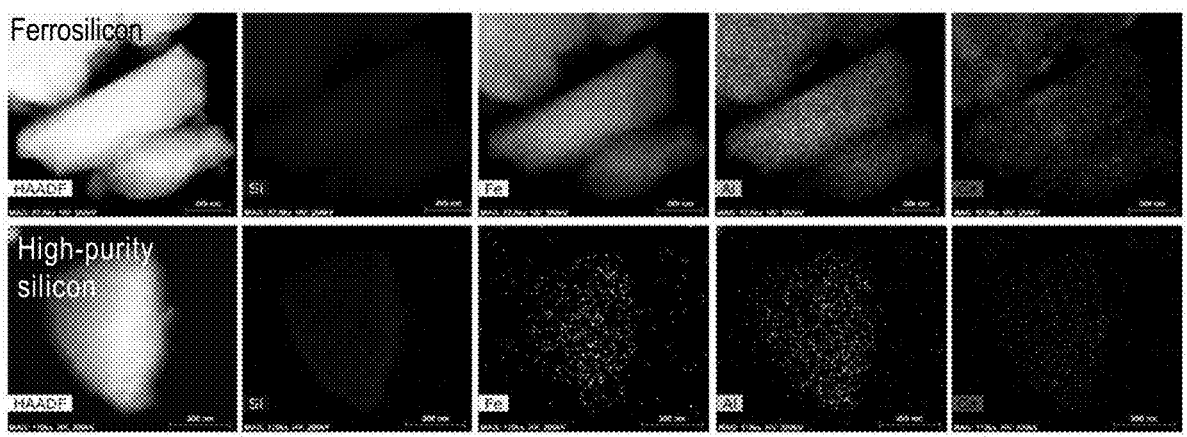
FIG. 4 is an analysis diagram of the element distribution of high-purity silicon prepared in the first embodiment of the invention.

The table provided above shows concentration change of various elements before and after purification. The ICP test results show that the purity of silicon is changed from 80.79% to 99.5% or more after a simple purification. FIG. 4 also shows that the concentration of impurity elements is also significantly reduced.

By replacing the 99.73% high-purity silicon obtained in the above experiment with the metallurgical ferrosilicon powder in step (1), the same operation steps are performed. After repeating the above steps three times, the purity of the silicon in the product obtained reaches 99.99% or more.

Second Embodiment

A method for purifying silicon by means of phase separation dealloying reaction includes the following steps.

(1) The metallurgical ferrosilicon powder (content of Si is 80%) and magnesium powder are mixed uniformly at the mass ratio of 1:1.2 (silicon to magnesium) and put into a heat resistant container.

(2) The container is placed in a tube furnace filled with inert gas and heated to 500° C. at a heating rate of 10° C./min. The temperature is kept for 4 hours, and the obtained product is a silicon-magnesium compound mixture. After the product is cooled to room temperature along with the furnace, the product is taken out.

(3) The product obtained in step (2) is exposed to an $NH_3$ atmosphere and heated to 850° C. at a heating rate of 3° C./min. The temperature is kept for 6 hours. After the product is cooled to room temperature along with the furnace, the product is taken out.

(4) The product obtained in step (3) is subjected to an acid-pickling treatment with 1M of nitric acid to remove magnesium nitride, and then washed, centrifuged, and dried to obtain high-purity silicon. The purity of silicon is 99.15%.

Third Embodiment

A method for purifying silicon by means of phase separation dealloying reaction includes the following steps.

(1) The metallurgical ferrosilicon powder (content of Si is 80%) and magnesium powder are mixed uniformly at the mass ratio of 1:1.6 (silicon to magnesium) and put into a heat resistant container.

(2) The container is placed in a tube furnace filled with inert gas and heated to 650° C. at a heating rate of 15° C./min. The temperature is kept for 8 hours, and the obtained product is a silicon-magnesium compound mixture. After the product is cooled to room temperature along with the furnace, the product is taken out.

(3) The product obtained in step (2) is exposed to an $NH_3$ atmosphere and heated to 800° C. at a heating rate of 10° C./min. The temperature is kept for 5 hours. After the product is cooled to room temperature along with the furnace, the product is taken out.

(4) The product obtained in step (3) is subjected to an acid-pickling treatment with 1M of sulfuric acid to remove magnesium nitride, and then washed, centrifuged, and dried to obtain high-purity silicon. The purity of silicon is 99.77%.

(5) Steps (1) to (4) are performed repeatedly by using the silicon obtained in step (3) as the silicon raw material to obtain silicon with higher purity as required.

Fourth Embodiment

A method for purifying silicon by means of phase separation dealloying reaction includes the following steps.

(1) The commercial metallurgical silicon powder (content of silicon is 98.4%) and magnesium powder are mixed uniformly at the mass ratio of 1:1.5 and put into a heat resistant container.

(2) The container is placed in a tube furnace filled with inert gas and heated to 550° C. at a heating rate of 13° C./min. The temperature is kept for 8 hours, and the obtained product is a silicon-magnesium compound. After the product is cooled to room temperature along with the furnace, the product is taken out.

(3) The product obtained in step (2) is exposed to an $N_2$/Ar mixed atmosphere and heated to 750° C. at a heating rate of 10° C./min. The temperature is kept for 9 hours. After the product is cooled to room temperature along with the furnace, the product is taken out.

(4) The product obtained in step (3) is subjected to an acid-pickling treatment with 1M of hydrochloric acid to remove magnesium nitride, and then washed, centrifuged, and dried to obtain high-purity silicon. The purity of silicon is 99.94%.

(5) Steps (1) to (4) are performed repeatedly by using the silicon obtained in step (3) as the silicon raw material to obtain silicon with a purity of 99.99% or more.

Fifth Embodiment

A method for purifying silicon by means of phase separation dealloying reaction includes the following steps.

(1) The commercial metallurgical silicon powder (content of silicon is 98.4%) and magnesium powder are mixed uniformly at the mass ratio of 1:2.3 and put into a heat resistant container.

(2) The container is placed in a tube furnace filled with inert gas and heated to 600° C. at a heating rate of 5° C./min. The temperature is kept for 19 hours, and the obtained product is a silicon-magnesium compound. After the product is cooled to room temperature along with the furnace, the product is taken out.

(3) The product obtained in step (2) is exposed to a nitrogen-containing plasma mixed atmosphere and heated to 750° C. at a heating rate of 10° C./min. The temperature is kept for 10 hours. After the product is cooled to room temperature along with the furnace, the product is taken out.

(4) The product obtained in step (3) is subjected to an acid-pickling treatment with 1M of hydrochloric acid to remove magnesium nitride, and then washed, centrifuged, and dried to obtain high-purity silicon. The purity of silicon is 99.62%.

Sixth Embodiment

A method for purifying silicon by means of phase separation dealloying reaction includes the following steps.

(1) The boron-containing (0.2 wt %) silicon powder and magnesium powder are mixed uniformly at the mass ratio of 1:1.5 and put into a sealed container.

(2) The container is placed in a tube furnace filled with inert gas and heated to 580° C. at a heating rate of 5° C./min. The temperature is kept for 4 hours, and the obtained product is a silicon-magnesium compound. After the product is cooled to room temperature along with the furnace, the product is taken out.

(3) The product obtained in step (2) is exposed to an $N_2$ atmosphere and heated to 700° C. at a heating rate of 10° C./min. The temperature is kept for 3 hours. After the product is cooled to room temperature along with the furnace, the product is taken out.

(4) The product obtained in step (3) is subjected to an acid-pickling treatment with hydrochloric acid to remove magnesium nitride, and then washed, centrifuged, and dried to obtain high-purity silicon. The purity of silicon is 99.95%.

(5) Steps (1) to (4) are performed repeatedly by using the silicon obtained in step (3) to obtain silicon with higher purity.

The invention discloses a method for purifying silicon by means of phase separation dealloying reaction, which includes the following steps. Silicon containing metal and non-metal element impurities is adopted as raw materials. The silicon is uniformly mixed with an appropriate amount of magnesium powder and fully reacted in an inert atmosphere, so that the silicon is completely converted into a silicon-magnesium alloy. Thereafter, the resulting product is placed in a nitrogen-containing atmosphere and reacted under suitable temperature conditions to realize the separation of silicon and magnesium nitride. Then, the reactant is subjected to an acid-pickling treatment to obtain high-purity silicon. The steps of the invention are simple and feasible, there are low requirements for silicon-containing raw materials, minor reaction pollution, no production of toxic gas, low energy consumption, high yield, high purity, and by-products can be recycled and reused. The invention has a simple process and low production cost. The invention overcomes the difficulties of the existing silicon purification technology, which has high cost, high energy consumption and complex process. The invention provides a technical method for large-scale preparation of high-purity silicon, facilitating to reduce the current price of high-purity silicon and improve the purity of silicon, while being capable of promoting the development of solar cells and electronic information industry.

Those skilled in the art can easily understand that the above descriptions are only preferred embodiments of the present invention and are not intended to limit the present invention. Any modification, equivalent replacement, and improvement and so on that is made within the spirit and principle of the present invention should all be included in the protection scope of the present invention.

What is claimed is:

1. A method for purifying silicon by means of phase separation dealloying reaction, comprising the following steps:

step 1, a silicon raw material containing impurities is mixed with magnesium powder and then fully reacted under an inert atmosphere so that silicon atoms in the silicon raw material react with magnesium to be converted into magnesium silicide, wherein the impurities in the silicon raw material are simultaneously separated from silicon, so as to obtain a first product;

step 2, the first product is placed in a nitrogen-containing atmosphere to undergo a nitriding reaction, in a process of the nitriding reaction, the magnesium silicide in the first product is converted into a liquid-phase magnesium nitride, while silicon is precipitated and crystallized from the liquid-phase magnesium nitride to form a three-dimensional porous silicon having a nano-skeleton structure and magnesium nitride distributed in pore channels of the three-dimensional porous silicon so as to obtain a second product; wherein silicon is further separated from the impurities in step 1 during the precipitation and crystallization of silicon; and step 3, the second product is treated by using acid-pickling, wherein magnesium nitride and the impurities in step 1 are dissolved and converted into a solution, and a solid product is collected to obtain a high-purity porous silicon, wherein a purity of the high-purity porous silicon is 99% or higher, wherein the nitrogen-containing atmosphere in step 2 comprises one or more of nitrogen, nitrogen plasma and a nitrogen-containing organic substance, wherein the high-purity porous silicon obtained in step 3 is used as the impurity-containing silicon raw material described in step 1, and step 1 to step 3 are performed repeatedly to further purify the high-purity porous silicon.

2. The method according to claim 1, wherein the impurity-containing silicon raw material in step 1 is crushed or ball milled to obtain a powdered silicon raw material.

3. The method according to claim 1, wherein a mass ratio of the content of silicon in the impurity-containing silicon raw material in step 1 to the magnesium powder is 1:(1-3).

4. The method according to claim 1, wherein the reaction temperature of step 1 is 400 to 900° C., the temperature is kept within the above range for 1 to 12 hours, and a heating rate is 1 to 20° C./min.

5. The method according to claim 1, wherein the inert atmosphere in step 1 is an argon atmosphere.

6. The method according to claim 1, wherein the silicon raw material in step 1 is metallurgical silicon, ferrosilicon alloy, waste silicon from an electronic industry or waste silicon cutting in a solar industry.

7. The method according to claim 1, wherein a reaction temperature of the nitriding reaction in step 2 is 400 to 1000° C., the temperature is kept within the above range for 1 to 10 hours, and a heating rate is 1 to 20° C./min.

8. The method according to claim 1, wherein an inorganic acid-containing aqueous solution is adopted in the acid-pickling treatment in step 3, and the inorganic acid is hydrochloric acid, sulfuric acid or nitric acid.

* * * * *